United States Patent
Shim et al.

(10) Patent No.: US 8,508,432 B2
(45) Date of Patent: Aug. 13, 2013

(54) MULTI-DISPLAY APPARATUS

(75) Inventors: Hong-shik Shim, Seoul (KR); In-seo Kee, Seongnam-si (KR); Young-gu Lee, Suwon-si (KR)

(73) Assignees: Samsung Electronics Co., Ltd. (KR); Samsung Display Co., Ltd. (KR)

( * ) Notice: Subject to any disclaimer, the term of this patent is extended or adjusted under 35 U.S.C. 154(b) by 406 days.

(21) Appl. No.: 12/423,278

(22) Filed: Apr. 14, 2009

(65) Prior Publication Data

US 2010/0117928 A1 May 13, 2010

(30) Foreign Application Priority Data

Nov. 7, 2008 (KR) ................ 10-2008-0110489

(51) Int. Cl.
*G09G 5/00* (2006.01)
(52) U.S. Cl.
USPC .......... 345/1.3; 345/1.1; 345/903; 349/74
(58) Field of Classification Search
USPC .......... 345/1.1–3.4, 4, 5, 6, 903; 349/74, 349/73
See application file for complete search history.

(56) References Cited

U.S. PATENT DOCUMENTS

| | | | | |
|---|---|---|---|---|
| 5,903,328 | A * | 5/1999 | Greene et al. | 349/73 |
| 6,483,482 | B1 * | 11/2002 | Kim | 345/3.1 |
| 6,728,023 | B1 * | 4/2004 | Alioshin et al. | 359/290 |
| 6,881,946 | B2 * | 4/2005 | Cok et al. | 250/208.6 |
| 6,940,529 | B2 * | 9/2005 | Deering | 345/647 |
| 7,079,157 | B2 * | 7/2006 | Deering | 345/613 |
| 7,441,902 | B2 * | 10/2008 | Dvorkis et al. | 353/30 |
| 7,564,501 | B2 * | 7/2009 | Miyazawa | 348/383 |
| 7,619,585 | B2 * | 11/2009 | Bell et al. | 345/9 |
| 7,916,223 | B2 * | 3/2011 | Kitagawa et al. | 349/15 |
| 8,102,332 | B2 * | 1/2012 | Nelson et al. | 345/1.1 |
| 2007/0242186 | A1 | 10/2007 | Ikeno et al. | |
| 2007/0262916 | A1 * | 11/2007 | Kee et al. | 345/1.3 |
| 2008/0078657 | A1 | 4/2008 | Hawkins et al. | |
| 2008/0079657 | A1 | 4/2008 | Kee et al. | |
| 2008/0204356 | A1 * | 8/2008 | Shim et al. | 345/1.3 |
| 2008/0224949 | A1 * | 9/2008 | Lee et al. | 345/1.3 |
| 2008/0240356 | A1 | 10/2008 | Robinson | |

FOREIGN PATENT DOCUMENTS

| | | |
|---|---|---|
| EP | 1 612 658 A2 | 1/2006 |
| JP | 06-095139 A | 4/1994 |
| JP | 08-122769 A | 5/1996 |
| KR | 1020000075223 A | 12/2000 |
| KR | 1020010010519 A | 2/2001 |
| KR | 1020010046467 A | 6/2001 |
| KR | 1020010064826 A | 7/2001 |

(Continued)

OTHER PUBLICATIONS

European Search Report for Application No. 09173524.1-1228/2184676 dated Nov. 22, 2010.

(Continued)

*Primary Examiner* — Dmitriy Bolotin
(74) *Attorney, Agent, or Firm* — Cantor Colburn LLP

(57) ABSTRACT

A multi-display apparatus includes; a first display panel including a first display device, and a second display panel including a second display device, wherein pixels of the first display panel are vertically aligned with pixels of the second display panel in an area where the first display panel and the second display panel overlap.

9 Claims, 10 Drawing Sheets

(56) References Cited

FOREIGN PATENT DOCUMENTS

| | | |
|---|---|---|
| KR | 1020010064827 A | 7/2001 |
| KR | 1020030093614 A | 12/2003 |
| KR | 1020070096213 A | 10/2007 |
| KR | 1020070097180 A | 10/2007 |
| KR | 1020080027715 A | 3/2008 |
| KR | 1020080030261 A | 4/2008 |
| KR | 1020080030262 A | 4/2008 |

OTHER PUBLICATIONS

European Examination Report for Application No. 09 173 524.1-1228 dated Jun. 11, 2012.

* cited by examiner

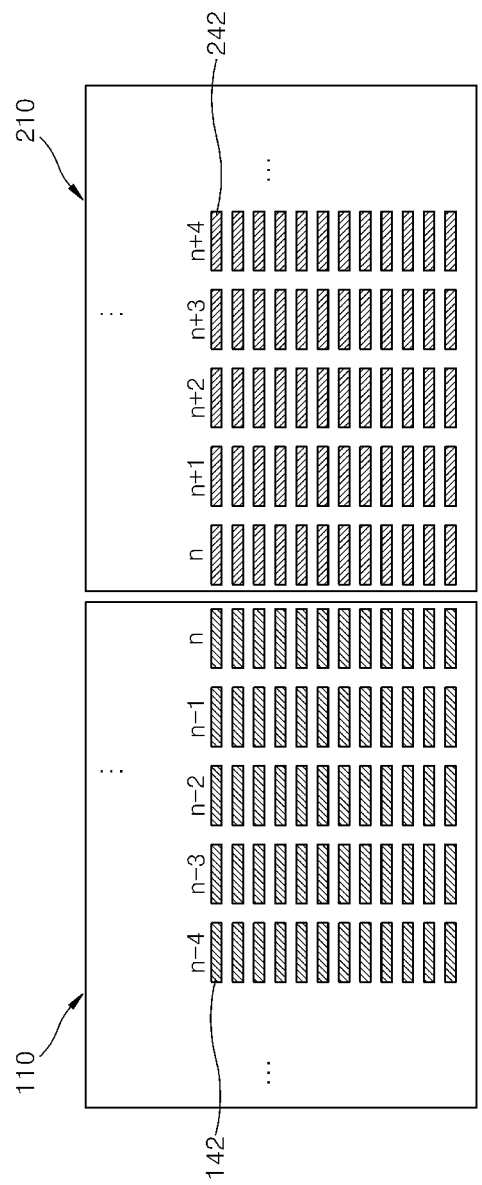

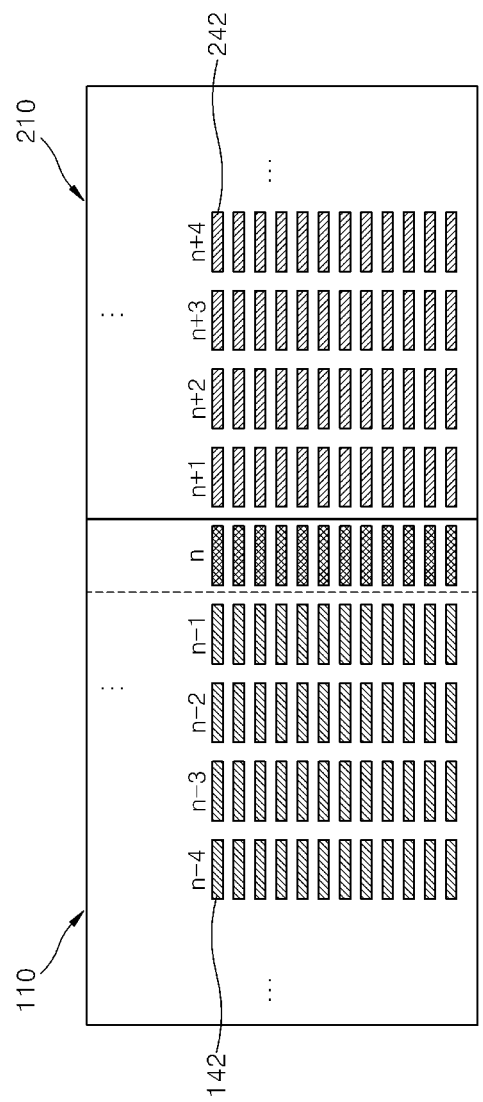

MULTI-DISPLAY APPARATUS

CROSS-REFERENCE TO RELATED APPLICATIONS

This application claims priority to Korean Patent Application No. 10-2008-0110489, filed on Nov. 7, 2008, and all the benefits accruing therefrom under 35 U.S.C. §119, the contents of which in its entirety are herein incorporated by reference.

BACKGROUND

1. Field

One or more exemplary embodiments relate to a multi-display apparatus for implementing a screen by interconnecting a plurality of display panels, and more particularly, to a folding type multi-display apparatus.

2. Description of the Related Art

In general, a multi-display apparatus creates a single large screen by interconnecting a plurality of display panels. For example, a large screen may be made by interconnecting a plurality of Braun tubes (also called cathode ray tubes "CRTs"), such as large-scale televisions (TVs), for display purposes.

Such a multi-display apparatus is typically made by interconnecting unit panels, e.g., individual displays, in a row. That is, a plurality of unit panels is prepared and then a multi-screen in which the unit panels are interconnected in a row is created. However, when the unit panels are interconnected in this way, a natural continuous image cannot be displayed and the image can be seriously disconnected between the unit panels due to areas between the unit panels which are typically occupied by the housings of the displays. Also, image disconnection can occur between the unit panels when the multi-screen is not viewed from a normal direction of the unit panels.

SUMMARY

One or more exemplary embodiments include a multi-display apparatus capable of implementing a natural image by preventing image disconnection between display panels.

Additional aspects will be set forth in part in the description which follows and, in part, will be apparent from the description, or may be learned by practice of the exemplary embodiments.

To achieve the above and/or other aspects, one or more exemplary embodiments may include a multi-display apparatus including; a first display panel including a first display device, and a second display panel including a second display device, wherein pixels of the first display panel are vertically aligned with pixels of the second display panel in an area where the first display panel and the second display panel overlap.

In one exemplary embodiment, a length of an overlapping portion where the pixels of the first display panel are vertically aligned with the pixels of the second display panel may be determined based on a distance between the first display device and the second display device, and based on a viewing angle which is substantially normal to at least one of the first display panel and the second display panel.

In one exemplary embodiment, the length of the overlapping portion may be determined according to Equation 1:

$$l = d \times \tan(\theta) \quad \text{(Equation 1)}$$

Wherein, l represents the length of the overlapping portion where the pixels of the first display panel are vertically aligned with the pixels of the second display panel, d represents the distance between the first display device and the second display device, and θ represents the viewing angle which is substantially normal to at least one of the first display panel and the second display panel.

In one exemplary embodiment, a size of the pixels of the second display panel that overlap the pixels of the first display panel may be equal to or smaller than a size of non-overlapping pixels of the second display panel. Also, in one exemplary embodiment, a luminance level of the pixels of the second display panel that overlap the pixels of the first display panel may be substantially equal to or lower than a luminance level of non-overlapping pixels of the second display panel. Also, in one exemplary embodiment, the pixels of the second display panel that overlap the pixels of the first display panel may have a smaller size and a higher luminance level than non-overlapping pixels of the second display panel.

In one exemplary embodiment, substantially the same image signal may be transmitted to the pixels of the first display penal that are vertically aligned with pixels of the second display panel and the pixels of the second display panel that are vertically aligned with the pixels of the first display panel.

In one exemplary embodiment, a length of an overlapping portion where the pixels of the first display panel are vertically aligned with the pixels of the second display panel may be about 0.1 to about 3 times a pixel length.

In one exemplary embodiment, the first display panel may further include; a first substrate on which the first display device is disposed, and a first cover which covers and protects the first display device, and the second display panel may further include; a second substrate on which the second display device is disposed, and a second cover which covers and protects the second display device.

In one exemplary embodiment, the first display panel and the second display panel may be interconnected to allow the multi-display apparatus to be foldable. In one exemplary embodiment, each of the first display device and the second display device may be one of a liquid crystal display ("LCD") device, a field emission display ("FED") device, a plasma display panel ("PDP"), and an organic light-emitting diode ("OLED").

As such, the multi-display apparatus may implement a high-quality image that is naturally connected between display panels, by preventing or reducing image disconnection between the display panels.

BRIEF DESCRIPTION OF THE DRAWINGS

The above and/or other aspects, advantages, and features of the invention will become more apparent by describing in further detail exemplary embodiments thereof with reference to the accompanying drawings, of which:

FIG. 6A is a diagram illustrating an exemplary embodiment of an arrangement order of pixels before two display panels overlap each other; and FIG. 6B is a diagram illustrating an exemplary embodiment of an arrangement order of pixels when two display panels overlap each other.

DETAILED DESCRIPTION

Figure 1:
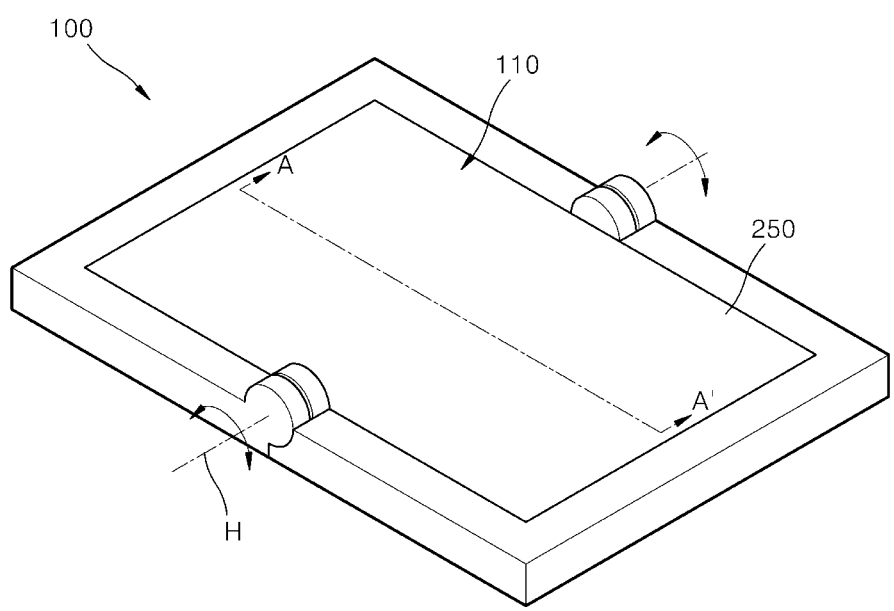
FIG. 1 is a front perspective view of an exemplary embodiment of a folding type multi-display apparatus in an unfolded state.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
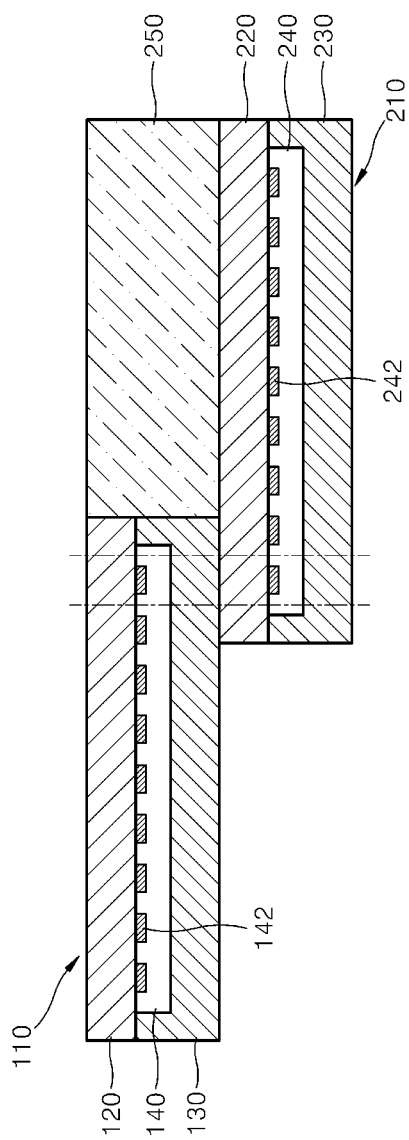
FIG. 2 is a cross-sectional view of the exemplary embodiment of a folding type multi-display apparatus taken along line A-A' of FIG. 1.

FIG. 1 is a front perspective view of an exemplary embodiment of a folding type multi-display apparatus 100 in an unfolded state. FIG. 2 is a cross-sectional view of the exemplary embodiment of a folding type multi-display apparatus taken along line A-A' of FIG. 1. Although the current exemplary embodiment of a multi-display apparatus 100 may be made by interconnecting a plurality of display panels by using various methods, for convenience of explanation, it is assumed here that the multi-display apparatus 100 is manufactured by interconnecting two display panels.

Referring to FIGS. 1 and 2, the multi-display apparatus 100 includes a first display panel 110 and a second display panel 210 of which at least a portion overlaps the first display panel 110 as shown in FIG. 2. In FIGS. 1 and 2, the first and second display panels 110 and 210 respectively correspond to upper and lower panels. A plurality of pixels 142 of the first display panel 110 overlaps a plurality of pixels 242 of the second display panel 210 in an overlapping area of the first and second display panels 110 and 210. In one exemplary embodiment the pixels 142 and 242 are aligned with one another along the dotted lines shown in FIG. 2. First and second display devices 140 and 240, which respectively include the pixels 142 and 242 for displaying images, are respectively included in the first and second display panels 110 and 210. Meanwhile, the first display panel 110 may further include a first substrate 120 on which the first display device 140 is formed, and a first cover 130 that covers and protects the first display device 140. The second display panel 210 may further include a second substrate 220 on which the second display device 240 is formed, and a second cover 230 that covers and protects the second display device 240.

The images generated by the first and second display devices 140 and 240 are respectively displayed through the first and second covers 130 and 230 in a top emission type multi-display apparatus or are respectively displayed through the first and second substrates 120 and 220 in a bottom emission type multi-display apparatus. For example, the multi-display apparatus 100 may be a bottom emission type as illustrated in FIGS. 1 and 2. Meanwhile, each of the first and second display devices 140 and 240 which are respectively included in the first and second display panels 110 and 210 may be one of various flat panel display devices, exemplary embodiments of which include a liquid crystal display ("LCD") device, a field emission display ("FED") device, a plasma display panel ("PDP"), and an organic light-emitting diode ("OLED").

In the current exemplary embodiment, a single screen that is foldable about a hinge axis H may be implemented as illustrated in FIG. 1 by interconnecting two display panels such as the first and second display panels 110 and 210. Here, when unfolded, a step may be formed between the first and second display panels 110 and 210 in a vertical direction as illustrated in FIG. 2.

As such, image disconnection that occurs between the first and second display panels 110 and 210 when the screen is not viewed from a normal direction of the first and second display panels 110 and 210 may be prevented by forming a step between the first and second display panels 110 and 210 in a vertical direction and by overlapping the pixels 142 of the first display panel 110 and the pixels 242 of the second display panel 210 in the overlapping area of the first and second display panels 110 and 210, e.g., the pixels 142 and the pixels 242 are vertically aligned in the overlapping area. Meanwhile, a step can appear between the first and second display panels 110 and 210 in a vertical direction and the appearance of the step may be prevented by planarizing an upper surface of the multi-display apparatus 100. A transparent plate 250 having the same thickness as the first display panel 110 may be formed on the second display panel 210 in order to reduce the appearance of a step.

Figure 3A:
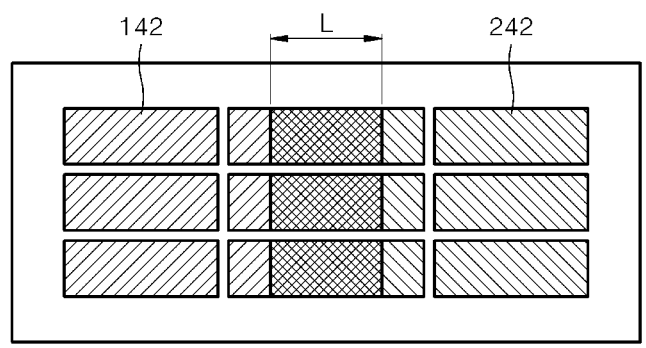
FIG. 3A is a diagram illustrating an exemplary embodiment of a pixel overlapping state when an overlapping area of two display panels stacked on top of one another is viewed in a minus (−) direction as indicated in FIG. 3C.
Figure 3B:
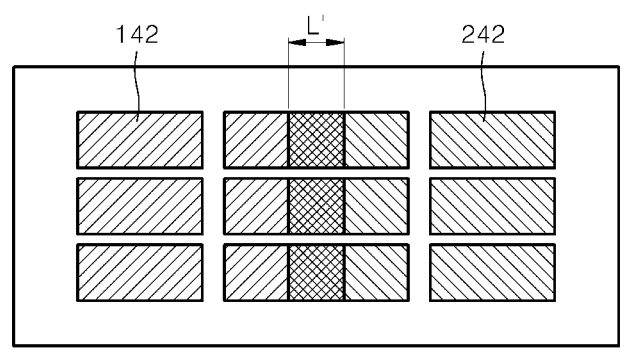
FIG. 3B is a diagram illustrating an exemplary embodiment of a pixel overlapping state when an overlapping area of two display panels stacked on top of one another is viewed in a plus (+) direction as indicated in FIG. 3C.
Figure 3C:
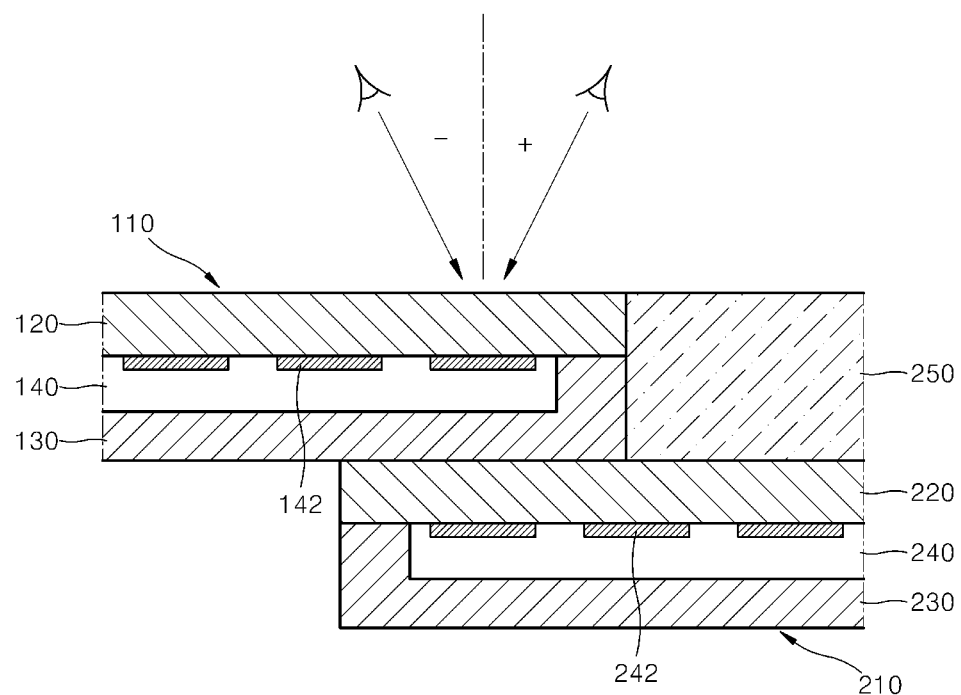
FIG. 3C is a diagram illustrating an exemplary embodiment of viewing angle directions of two display panels stacked on top of one another.
Figure 4:
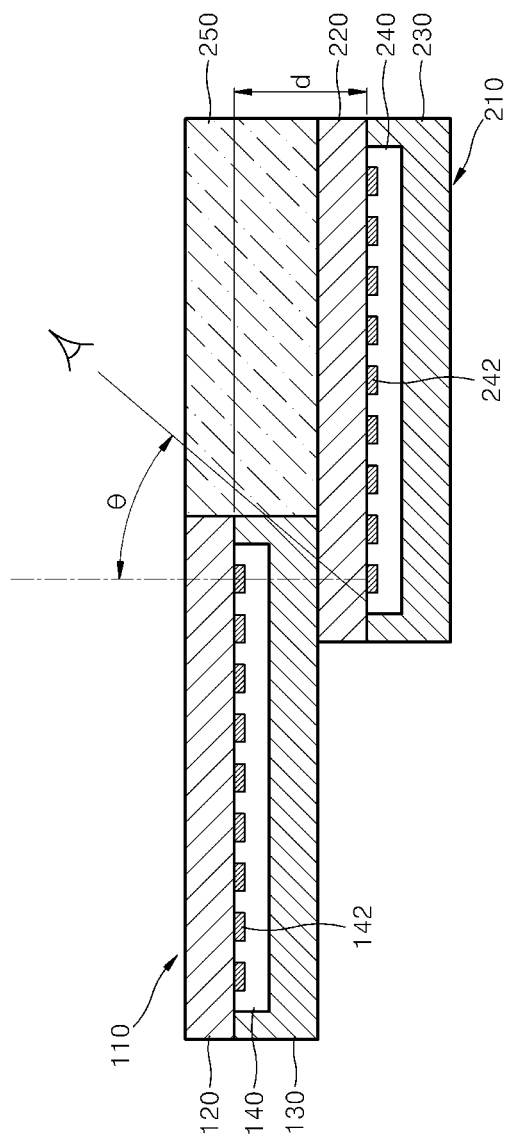
FIG. 4 is a diagram illustrating an exemplary embodiment of correlations between a pixel overlapping state, a viewing angle, and a distance between two display devices.

FIG. 3A is a diagram illustrating an exemplary embodiment of a pixel overlapping state when an overlapping area of the first and second display panels 110 and 210 illustrated in FIG. 2 is viewed in a minus (−) direction as indicated in FIG. 3C. FIG. 3B is a diagram illustrating an exemplary embodiment of a pixel overlapping state when an overlapping area of the first and second display panels 110 and 210 illustrated in FIG. 2 is viewed in a plus (+) direction as indicated in FIG. 3C. FIG. 3C is a diagram illustrating exemplary embodiments of viewing angle directions of the first and second display panels 110 and 210 illustrated in FIG. 2. FIG. 4 is a diagram illustrating an exemplary embodiment of correlations between a pixel overlapping state, a viewing angle θ, and a distance d between the first and second display devices 140 and 240 illustrated in FIG. 2. FIGS. 3A through 3C and 4 will be described in conjunction with FIG. 2.

Referring to FIG. 3A, when the overlapping area of the first and second display panels 110 and 210 is viewed in the minus (−) direction, a portion of the pixels 142 of the first display panel 110 overlaps a portion of the pixels 242 of the second display panel 210 in the overlapping area and thus luminance is not reduced between the first and second display panels 110 and 210. In FIG. 3A, L represents a length of an overlapping portion where the pixels 142 of the first display panel 110 overlap the pixels 242 of the second display panel 210 as viewed from the minus (−) direction.

Referring to FIG. 3B, when the overlapping area of the first and second display panels 110 and 210 is viewed in the plus (+) direction, a portion of the pixels 142 of the first display panel 110 also overlaps a portion of the pixels 242 of the second display panel 210 in the overlapping area. Thus, luminance is not reduced between the first and second display panels 110 and 210. In FIG. 3A, L' represents a length of an overlapping portion where the pixels 142 of the first display panel 110 overlap the pixels 242 of the second display panel 210 as viewed from the plus (+) direction.

In one exemplary embodiment, each of the length L and the length L' may be about 0.1 to about 3 times a pixel length. However, the lengths L and L' are not limited thereto.

In more detail, referring to FIG. 4, a length of an overlapping portion where the pixels 142 of the first display panel 110 overlap the pixels 242 of the second display panel 210 may be determined based on a distance d between the first and second display devices 140 and 240, and based on a viewing angle θ taken from a line which is substantially normal to the first and second display panels 110 and 210. In more detail, the length of the overlapping portion may be determined according to Equation 1:

$$l = d \times \tan(\theta) \quad \text{(Equation 1)},$$

where, l represents the length of the overlapping portion where the pixels 142 of the first display panel 110 overlap the pixels 242 of the second display panel 210, d represents the distance between the first and second display devices 140 and 240, and θ represents the viewing angle taken from a line which is substantially normal to the first and second display panels 110 and 210.

Table 1 illustrates exemplary correlations between the viewing angle θ, the distance d, and the length l. Here, units of the viewing angle θ, the distance d, and the length l respectively are degrees (°), mm, and μm.

TABLE 1

| | d | | | | |
|---|---|---|---|---|---|
| θ | 0.1 | 0.2 | 0.3 | 0.4 | 0.5 |
| 5  | 9  | 17  | 26  | 35  | 44  |
| 10 | 18 | 35  | 53  | 71  | 88  |
| 15 | 27 | 54  | 80  | 107 | 134 |
| 20 | 36 | 73  | 109 | 146 | 182 |
| 25 | 47 | 93  | 140 | 187 | 233 |
| 30 | 58 | 115 | 173 | 231 | 289 |

Referring to Table 1, for example, if the distance d is 0.2 mm and the viewing angle θ is 30°, the length l may be greater than 115 μm in order to prevent image disconnection between the first and second display panels 110 and 210.

Figure 5A:
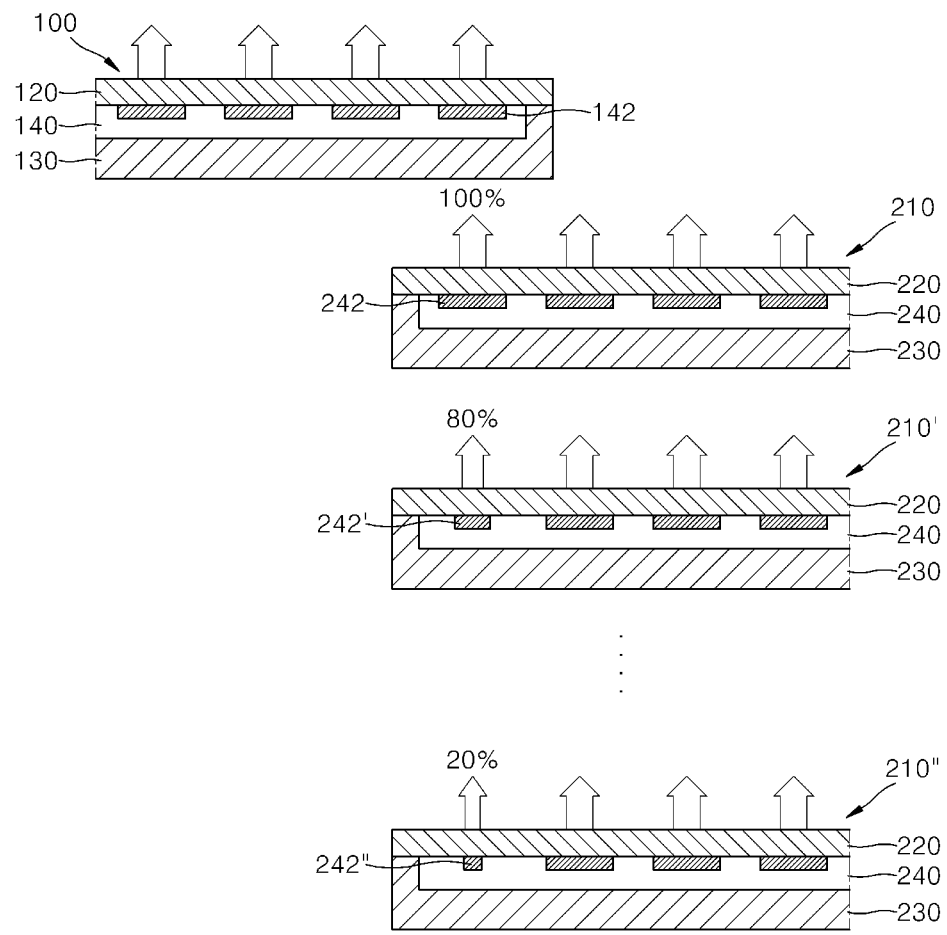
FIG. 5A is a diagram illustrating an exemplary embodiment of a pixel overlapping method of controlling a pixel size of a lower display panel in an overlapping area of two display panels.
Figure 5B:
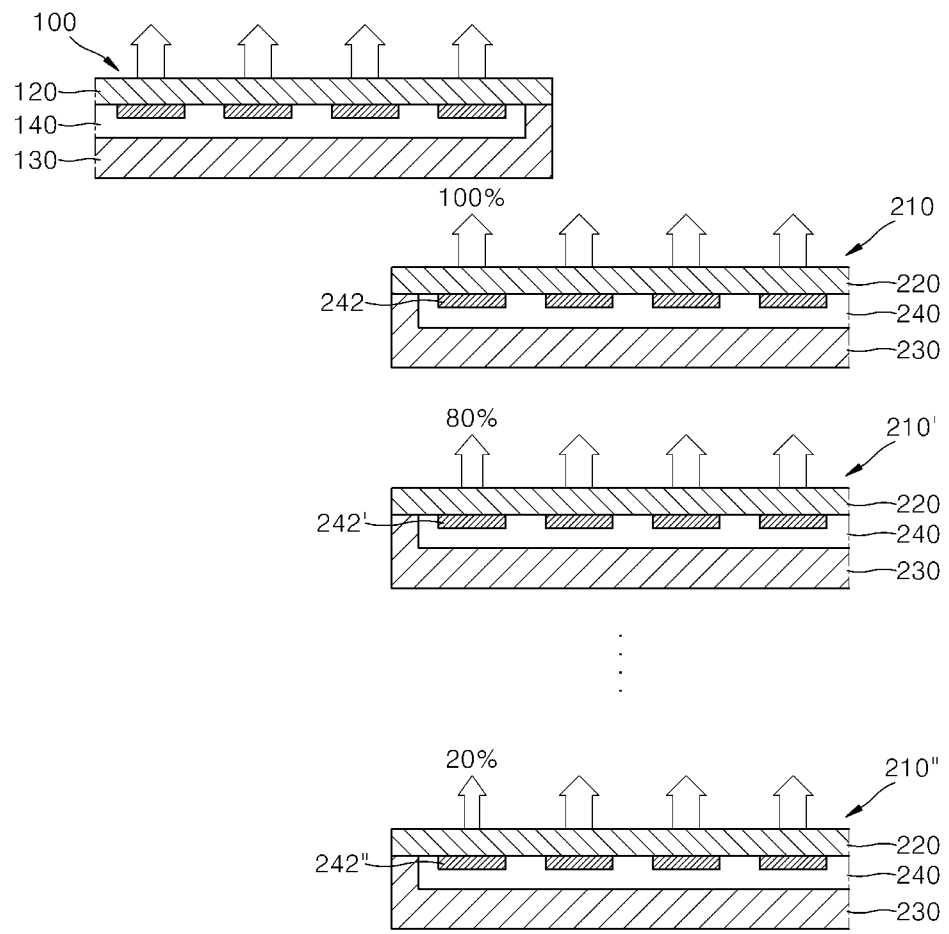
FIG. 5B is a diagram illustrating an exemplary embodiment of a pixel overlapping method of controlling a pixel luminance level of a lower display panel in an overlapping area of two display panels.

FIGS. 5A and 5B are diagrams illustrating an exemplary embodiment of pixel overlapping methods in an overlapping area of the first and second display panels 110 and 210 illustrated in FIG. 2, in order to prevent image disconnection in the multi-display apparatus 100 illustrated in FIG. 1. FIGS. 5A and 5B will be described in conjunction with FIG. 2.

FIG. 5A is a diagram illustrating an exemplary embodiment of a pixel overlapping method of controlling a pixel size of the second display panel 210 in the overlapping area.

Referring to FIG. 5A, in order to prevent image disconnection, a size of a pixel 242 of the second display panel 210, which overlaps a pixel 142 of the first display panel 110, may be controlled. In more detail, the size of the pixel 242 of the second display panel 210 may be controlled to be equal to or smaller than a size of non-overlapping pixels of the second display panel 210. FIG. 5A shows second display panels 210, 210', and 210" which may be overlapped by the first display panel 110. In FIG. 5A, the size of the pixel 242 is substantially equal to the size of the non-overlapping pixels, a size of a pixel 242' is about 80% of the size of the non-overlapping pixels, and a size of a pixel 242" is about 20% of the size of the non-overlapping pixels. However, the illustrated exemplary embodiments are shown for illustrative purposes only and the pixel sizes are not limited thereto.

FIG. 5B is a diagram illustrating an exemplary embodiment of a pixel overlapping method of controlling a pixel luminance level of the second display panel 210 in the overlapping area.

Referring to FIG. 5B, in order to prevent image disconnection, a luminance level of a pixel 242 of the second display panel 210, which overlaps a pixel 142 of the first display panel 110, may be controlled, rather than a size thereof as in the exemplary embodiment shown in FIG. 5A. In more detail, the luminance level of the pixel 242 of the second display panel 210 may be controlled to be equal to or lower than a luminance level of non-overlapping pixels of the second display panel 210. In such an exemplary embodiment, a size of the pixel 242 of the second display panel 210 may be equal to a size of the non-overlapping pixels. FIG. 5B shows second display panels 210, 210', and 210" which may be overlapped by the first display panel 110. In FIG. 5B, the luminance level of the pixel 242 is substantially equal to the luminance level of the non-overlapping pixels, a luminance level of a pixel 242' is about 80% of the luminance level of the non-overlapping pixels, and a luminance level of a pixel 242" is about 20% of the luminance level of the non-overlapping pixels. However, the illustrated exemplary embodiments are shown for illustrative purposes only and the pixel luminance levels are not limited thereto.

The pixel size and the pixel luminance level of the second display panel 210 in the overlapping area are controlled as described above because, if an overlapping portion is unnecessarily long or if a luminance level of the overlapping portion is higher than that of a non-overlapping portion, pixels between the first and second display panels 110 and 210 have a higher luminance level than pixels on either side thereof, and thus significant image disconnection occurs.

Figure 5C:
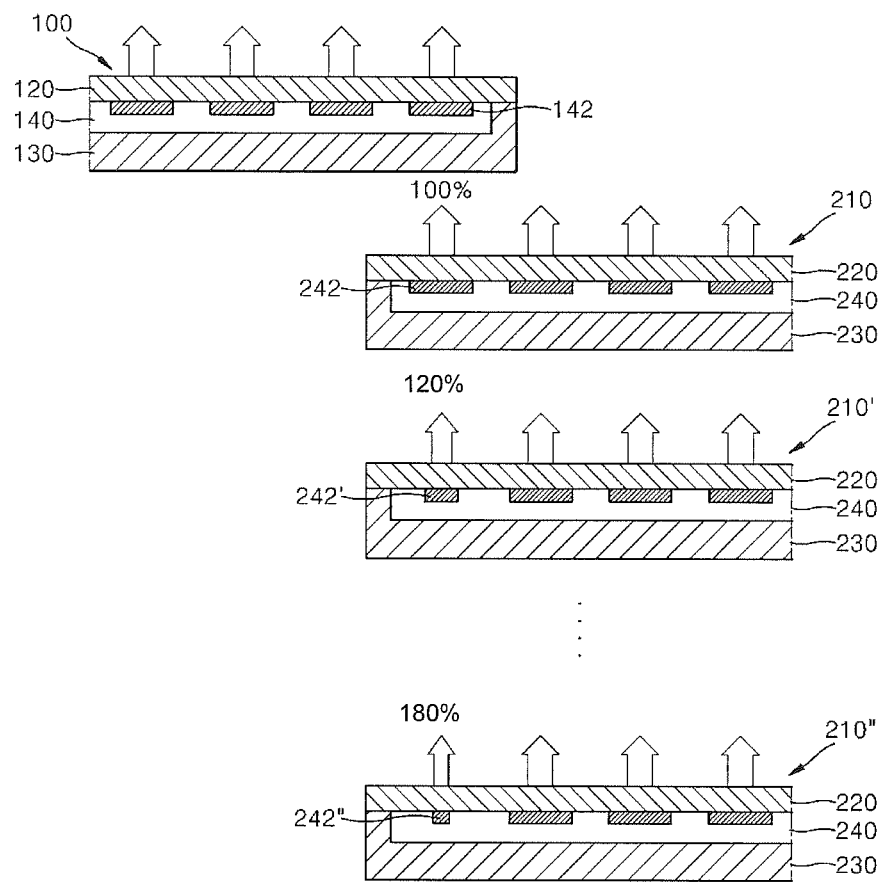
FIG. 5C is a diagram illustrating an exemplary embodiment of a pixel overlapping method of controlling a pixel size and a pixel luminance level of a lower display panel in an overlapping area of two display panels.

Meanwhile, in addition to the above exemplary embodiments of pixel overlapping methods, in order to prevent image disconnection, the overlapping pixels 242 of the second display panel 210 may be controlled to have a smaller size and a higher luminance level than the non-overlapping pixels. FIG. 5C is a diagram illustrating an exemplary embodiment of a pixel overlapping method of controlling a pixel size and a pixel luminance level of the second display panel 210 in the overlapping area. Referring to FIG. 5C, the size of the pixel 242 of the second display in the overlapping area may be controlled to be smaller than a size of non-overlapping pixels of the second display panel 210, and the luminance level of the pixel 242 of the second display panel 210 in the overlapping area may be controlled to be higher than a luminance level of non-overlapping pixels of the second display panel 210.

FIG. 6A is a diagram illustrating an exemplary embodiment of an arrangement order and a signal reception order of pixels before the first and second display panels 110 and 210 illustrated in FIG. 2 overlap each other. FIG. 6B is a diagram illustrating an exemplary embodiment of an arrangement order and a signal reception order of pixels when the first and second display panels 110 and 210 illustrated in FIG. 2 overlap each other.

Referring to FIGS. 6A and 6B, in one exemplary embodiment, when the first and second display panels 110 and 210 overlap each other in a vertical direction, the same driving signal is input to an nth column of the pixels 142 of the first display panel 110 and to an nth column of the pixels 242 of the second display panel 210. In such an exemplary embodiment, the nth column of the pixels 242 of the second display panel 210, which is a lower display panel, is not always required to have the same size as non-overlapping pixels and may be shorter than the non-overlapping pixels in a horizontal direction, e.g., its length may be shorter as shown in FIG. 5A, alternatively, it may also have a decreased luminance as discussed with respect to FIG. 5B.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A multi-display apparatus comprising:
a first display panel comprising a first display device; and
a second display panel comprising a second display device,
wherein pixels of the first display panel are vertically aligned with pixels of the second display panel in an area where the first display panel and the second display panel overlap,
a length of an overlapping portion where the pixels of the first display panel are vertically aligned with the pixels of the second display panel is determined according to the following equation:

$$l = d \times \tan(\theta)$$

wherein, l represents the length of the overlapping portion where the pixels of the first display panel are vertically aligned with the pixels of the second display panel, d represents the distance between the first display device and the second display device, and θ represents the viewing angle which is substantially normal to at least one of the first display panel and the second display panel, wherein the pixels of the first display panel and the pixels of the second display panel that overlap with each other display substantially the same image data.

2. The multi-display apparatus of claim 1, wherein a size of the pixels of the second display panel that overlap the pixels of the first display panel is substantially equal to or smaller than a size of non-overlapping pixels of the second display panel.

3. The multi-display apparatus of claim 1, wherein a luminance level of the pixels of the second display panel that overlap the pixels of the first display panel is substantially equal to or lower than a luminance level of non-overlapping pixels of the second display panel.

4. The multi-display apparatus of claim 1, wherein a length of an overlapping portion where the pixels of the first display panel are vertically aligned with the pixels of the second display panel is about 0.1 to about 3 times a pixel length.

5. The multi-display apparatus of claim 1, wherein
the first display panel further comprises:
a first substrate on which the first display device is disposed; and
a first cover which covers and protects the first display device, and wherein the second display panel further comprises:
a second substrate on which the second display device is disposed; and
a second cover which covers and protects the second display device.

6. The multi-display apparatus of claim 1, wherein the first display panel and the second display panel are interconnected to allow the multi-display apparatus to be foldable.

7. The multi-display apparatus of claim 6, wherein the multi-display apparatus further comprises a hinge attached to edges of the first display panel and the second display panel.

8. The multi-display apparatus of claim 1, wherein each of the first display device and the second display device is one of a liquid crystal display device, a field emission display device, a plasma display panel, and an organic light-emitting diode.

9. A multi-display apparatus comprising:
a first display panel comprising a first display device; and
a second display panel comprising a second display device,
wherein pixels of the first display panel are vertically aligned with pixels of the second display panel in an area where the first display panel and the second display panel overlap,
a length of an overlapping portion where the pixels of the first display panel are vertically aligned with the pixels of the second display panel is determined according to the following equation:

$$l = d \times \tan(\theta)$$

wherein, l represents the length of the overlapping portion where the pixels of the first display panel are vertically aligned with the pixels of the second display panel, d represents the distance between the first display device and the second display device, and $\theta$ represents the viewing angle which is substantially normal to at least one of the first display panel and the second display panel, and wherein the pixels of the second display panel that overlap the pixels of the first display panel have a smaller size and a higher luminance level than non-overlapping pixels of the second display panel.

* * * * *